United States Patent
Sandstrom et al.

(10) Patent No.: US 8,446,928 B2
(45) Date of Patent: *May 21, 2013

(54) EXTENDABLE ELECTRODE FOR GAS DISCHARGE LASER

(75) Inventors: Richard L. Sandstrom, Encinitas, CA (US); Tae (Mark) H. Chung, Murrieta, CA (US); Richard C. Ujazdowski, Poway, CA (US)

(73) Assignee: Cymer, Inc., San Diego, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/945,719

(22) Filed: Nov. 12, 2010

(65) Prior Publication Data

US 2011/0058580 A1    Mar. 10, 2011

Related U.S. Application Data

(63) Continuation of application No. 11/787,463, filed on Apr. 16, 2007, now Pat. No. 7,856,044, which is a continuation-in-part of application No. 10/854,614, filed on May 25, 2004, now Pat. No. 7,218,661, which is a continuation of application No. 10/056,619, filed on Jan. 23, 2002, now Pat. No. 6,801,560, which is a continuation-in-part of application No. 09/768,753, filed on Jan. 23, 2001, now Pat. No. 6,414,979.

(51) Int. Cl.
*H01S 3/097* (2006.01)

(52) U.S. Cl.
USPC .............................................. 372/87; 372/55

(58) Field of Classification Search
USPC .......................................................... 372/87
See application file for complete search history.

(56) References Cited

U.S. PATENT DOCUMENTS

| | | | |
|---|---|---|---|
| 3,631,319 A * | 12/1971 | Matthews | 315/241 R |
| 3,736,453 A | 5/1973 | Miller et al. | |
| 4,156,828 A | 5/1979 | Maisenhalder et al. | |
| 4,217,560 A * | 8/1980 | Kosyrev et al. | 372/58 |
| 4,223,279 A | 9/1980 | Bradford, Jr. et al. | |
| 4,240,044 A | 12/1980 | Fahlen et al. | |

(Continued)

FOREIGN PATENT DOCUMENTS

| DE | 291424 A5 | 6/1991 |
|---|---|---|
| DE | 4401892 A1 | 7/1995 |

(Continued)

OTHER PUBLICATIONS

U.S. Appl. No. 11/786,145, filed Apr. 10, 2007, Bykanov et al.

*Primary Examiner* — Xinning Niu

(74) *Attorney, Agent, or Firm* — Martine Penilla Group, LLP

(57) ABSTRACT

A movable electrode assembly for use in laser system includes a first electrode, a second electrode arranged opposite from the first electrode, the second electrode being spaced apart from the first electrode by a discharge gap and a discharge gap adjuster interfaced with at least one of the second electrode or the first electrode, the discharge gap adjuster configured to adjust the discharge gap. A movable electrode assembly for integration into a housing of a laser system includes a first electrode having a discharge surface, a second electrode having a discharge surface, such that the discharge surface of the first electrode and the discharge surface of the second electrode face each other in a spaced apart setting that defines a desired discharge gap, and a mechanism for moveably adjusting the spaced apart setting toward the desired discharge gap. A method of adjusting a discharge gap is also disclosed.

23 Claims, 13 Drawing Sheets

U.S. PATENT DOCUMENTS

| | | | |
|---|---|---|---|
| 4,245,194 A | 1/1981 | Fahlen et al. | |
| 4,247,829 A | 1/1981 | Yagi et al. | |
| 4,251,781 A | 2/1981 | Sutter, Jr. | |
| 4,414,488 A | 11/1983 | Hoffmann et al. | |
| 4,455,658 A | 6/1984 | Sutter et al. | |
| 4,481,634 A | 11/1984 | Grossman et al. | |
| 4,542,529 A * | 9/1985 | Pace et al. | 372/86 |
| 4,546,482 A | 10/1985 | Bagaglia et al. | |
| 4,573,496 A * | 3/1986 | Richard | 137/625.21 |
| 4,683,364 A | 7/1987 | Anderson | |
| 4,686,682 A | 8/1987 | Haruta et al. | |
| 4,703,490 A | 10/1987 | Brumme et al. | |
| 4,723,255 A | 2/1988 | Cohn et al. | |
| 4,742,527 A | 5/1988 | Wiedemann et al. | |
| 4,751,713 A | 6/1988 | Affleck | |
| 4,774,714 A | 9/1988 | Javan | |
| 4,833,686 A | 5/1989 | Eldridge | |
| 4,860,300 A | 8/1989 | Baumler et al. | |
| 4,866,682 A | 9/1989 | Uchihashi et al. | |
| 4,876,693 A | 10/1989 | Lucero et al. | |
| 4,953,174 A | 8/1990 | Eldridge et al. | |
| 4,959,840 A | 9/1990 | Akins et al. | |
| 5,023,884 A | 6/1991 | Akins et al. | |
| 5,025,445 A | 6/1991 | Anderson et al. | |
| 5,025,446 A | 6/1991 | Kuizenga | |
| 5,048,041 A | 9/1991 | Akins et al. | |
| 5,070,513 A | 12/1991 | Letardi | |
| 5,077,749 A * | 12/1991 | Noda et al. | 372/65 |
| 5,187,716 A | 2/1993 | Haruta et al. | |
| 5,189,678 A | 2/1993 | Ball et al. | |
| 5,247,534 A | 9/1993 | Muller-Horsche | |
| 5,313,481 A | 5/1994 | Cook et al. | |
| 5,315,611 A | 5/1994 | Ball et al. | |
| 5,359,620 A | 10/1994 | Akins et al. | |
| 5,448,580 A | 9/1995 | Birx et al. | |
| 5,471,965 A | 12/1995 | Kapich | |
| 5,535,233 A | 7/1996 | Mizoguchi et al. | |
| 5,557,629 A | 9/1996 | Mizoguchi et al. | |
| 5,646,954 A | 7/1997 | Das et al. | |
| 5,729,565 A | 3/1998 | Meller et al. | |
| 5,763,930 A | 6/1998 | Partlo | |
| 5,771,258 A | 6/1998 | Morton et al. | |
| 5,828,687 A | 10/1998 | Colgan | |
| 5,847,351 A | 12/1998 | Morita et al. | |
| 5,852,621 A | 12/1998 | Sandstrom | |
| 5,863,017 A | 1/1999 | Larson et al. | |
| 5,875,207 A | 2/1999 | Osmanow | |
| 5,923,693 A | 7/1999 | Ohmi et al. | |
| 5,940,421 A | 8/1999 | Partlo et al. | |
| 5,953,360 A | 9/1999 | Vitruk et al. | |
| 6,005,879 A | 12/1999 | Sandstrom | |
| 6,016,325 A | 1/2000 | Ness et al. | |
| 6,018,537 A | 1/2000 | Hofmann et al. | |
| 6,028,880 A | 2/2000 | Carlesi et al. | |
| 6,034,978 A | 3/2000 | Ujazdowski et al. | |
| 6,051,841 A | 4/2000 | Partlo | |
| 6,064,072 A | 5/2000 | Partlo et al. | |
| 6,067,311 A | 5/2000 | Morton et al. | |
| 6,094,448 A | 7/2000 | Fomenkov et al. | |
| 6,104,735 A | 8/2000 | Webb | |
| 6,109,574 A | 8/2000 | Pan et al. | |
| 6,128,323 A | 10/2000 | Myers et al. | |
| 6,151,349 A | 11/2000 | Gong et al. | |
| 6,164,116 A | 12/2000 | Rice et al. | |
| 6,192,064 B1 | 2/2001 | Algots et al. | |
| 6,208,674 B1 | 3/2001 | Webb et al. | |
| 6,208,675 B1 | 3/2001 | Webb | |
| 6,212,211 B1 | 4/2001 | Azzola et al. | |
| 6,219,368 B1 | 4/2001 | Govorkov | |
| 6,240,117 B1 | 5/2001 | Gong et al. | |
| 6,317,447 B1 | 11/2001 | Partlo et al. | |
| 6,414,979 B2 | 7/2002 | Ujazdowski et al. | |
| 6,452,199 B1 | 9/2002 | Partlo et al. | |
| 6,466,602 B1 | 10/2002 | Fleurov et al. | |
| 6,477,193 B2 | 11/2002 | Oliver et al. | |
| 6,493,374 B1 | 12/2002 | Fomenkov et al. | |
| 6,541,786 B1 | 4/2003 | Partlo et al. | |
| 6,549,551 B2 | 4/2003 | Partlo et al. | |
| 6,556,612 B2 | 4/2003 | Ershov et al. | |
| 6,567,450 B2 | 5/2003 | Myers et al. | |
| 6,576,912 B2 | 6/2003 | Visser et al. | |
| 6,618,421 B2 | 9/2003 | Das et al. | |
| 6,625,191 B2 | 9/2003 | Knowles et al. | |
| 6,635,844 B2 | 10/2003 | Yu | |
| 6,693,939 B2 | 2/2004 | Klene et al. | |
| 6,782,031 B1 | 8/2004 | Hofmann et al. | |
| 6,928,093 B2 | 8/2005 | Webb et al. | |
| 6,972,421 B2 | 12/2005 | Melnychuk et al. | |
| 7,002,168 B2 | 2/2006 | Jacob et al. | |
| 7,068,697 B1 | 6/2006 | Amada et al. | |
| 7,087,914 B2 | 8/2006 | Akins et al. | |
| 7,135,693 B2 | 11/2006 | Roux | |
| 7,196,342 B2 | 3/2007 | Ershov et al. | |
| 7,217,940 B2 | 5/2007 | Partlo et al. | |
| 7,217,941 B2 | 5/2007 | Rettig et al. | |
| 7,230,258 B2 | 6/2007 | Ruzic et al. | |
| 7,361,918 B2 | 4/2008 | Akins et al. | |
| 7,365,349 B2 | 4/2008 | Partlo et al. | |
| 7,368,741 B2 | 5/2008 | Melnychuk et al. | |
| 7,372,056 B2 | 5/2008 | Bykanov et al. | |
| 7,378,673 B2 | 5/2008 | Bykanov et al. | |
| 7,394,083 B2 | 7/2008 | Bowering et al. | |
| 7,405,416 B2 | 7/2008 | Algots et al. | |
| 7,415,056 B2 | 8/2008 | Das et al. | |
| 7,856,044 B2 * | 12/2010 | Sandstrom et al. | 372/87 |
| 2003/0021306 A1 * | 1/2003 | Fernald et al. | 372/20 |
| 2005/0083984 A1 | 4/2005 | Bragin et al. | |
| 2005/0259709 A1 | 11/2005 | Das et al. | |
| 2006/0175558 A1 | 8/2006 | Bakker et al. | |
| 2006/0219957 A1 | 10/2006 | Ershov et al. | |
| 2006/0249699 A1 | 11/2006 | Bowering et al. | |
| 2006/0250599 A1 | 11/2006 | Bakker et al. | |
| 2006/0255298 A1 | 11/2006 | Bykanov et al. | |
| 2007/0001131 A1 | 1/2007 | Ershov et al. | |
| 2007/0291279 A1 | 12/2007 | Rafac | |
| 2007/0291350 A1 | 12/2007 | Ershov et al. | |
| 2008/0043321 A1 | 2/2008 | Bowering et al. | |
| 2008/0048133 A1 | 2/2008 | Bykanov et al. | |
| 2008/0087847 A1 | 4/2008 | Bykanov et al. | |
| 2008/0149862 A1 | 6/2008 | Hansson et al. | |

FOREIGN PATENT DOCUMENTS

| | | | |
|---|---|---|---|
| JP | 56-016642 | 2/1981 | |
| JP | 64-084676 | 9/1987 | |
| JP | 02-094486 | 9/1988 | |
| JP | 63-217684 | 9/1988 | |
| JP | 63-311779 | 12/1988 | |
| JP | 02-192188 | 1/1989 | |
| JP | 01-179377 | 7/1989 | |
| JP | 02-158180 | 6/1990 | |
| JP | 04-228529 | 4/1991 | |
| JP | 04-305987 | 10/1992 | |
| JP | 405067828 A * | 3/1993 | 372/88 |
| JP | 06-029592 | 2/1994 | |
| JP | 06-112566 | 4/1994 | |
| JP | 06-120592 | 4/1994 | |
| JP | 08-083945 | 9/1994 | |
| JP | 10-242547 | 2/1997 | |
| JP | 03-217062 | 9/1999 | |
| JP | 2000-144284 | 5/2000 | |
| TW | M 272608 | 8/2005 | |
| TW | M272608 | 8/2005 | |
| WO | WO99-60679 | 11/1999 | |

* cited by examiner

EXTENDABLE ELECTRODE FOR GAS DISCHARGE LASER

PRIORITY CLAIM

This application is a continuation of and claims priority from U.S. Pat. No. 7,856,044, filed on Apr. 16, 2007 and issued on Dec. 21, 2010, and entitled "Extendable Electrode For Gas Discharge Laser," which is incorporated herein by reference in its entirety. The U.S. Pat. No. 7,856,044 is a continuation-in-part application of co-pending, co-owned U.S. Pat. No. 7,218,661, Entitled "Line Selected F.sub.2 Two Chamber Laser System" which issued on May 15, 2007 and which is a continuation of U.S. Pat. No. 6,801,560, Entitled "Line Selected F.sub.2 Two Chamber Laser System", which issued on Oct. 5, 2004, which is a continuation-in-part of U.S. Pat. No. 6,414,979, Entitled "Gas Discharge Laser with Blade-Dielectric Electrode", which issued on Jul. 2, 2002, the entire contents of each of which are hereby incorporated by reference herein for all purposes.

RELATED APPLICATIONS AND PATENTS

The present application is related to U.S. Pat. No. 6,466,602, Entitled "Gas Discharge Laser Long Life Electrodes", which issued on Oct. 15, 2002, the entire contents of each of which are hereby incorporated by reference herein for all purposes.

BACKGROUND

The present application relates generally to gas discharge laser systems. The present application is particularly, but not exclusively, useful as an extendable electrode system for a transverse discharge gas laser.

Electrode erosion in high-pressure transverse discharge lasers is usually the mechanism that limits their operational lifetime. The erosion of one or both of the electrodes is typically caused by the combined attack of fast ions and electrons from the current discharge. As the electrodes wear, the inter-electrode spacing increases to the point where the operational characteristics of the laser are so severely affected that laser operation must be stopped. The gain generator must then be refurbished with new electrodes in order to re-establish the correct electrode spacing.

In an attempt to increase laser lifetime, Japanese Patent Application JP06-029592 filed on Jun. 10, 1991 and titled "Discharge-Pumped Laser" discloses a scheme "to regulate an interval between electrodes in accordance with consumption of a discharge part of the electrode and to always hold a discharging width constant by providing moving means for at least one of discharge electrode pair toward the other electrode." However, to applicant's knowledge, such a relatively simplistic system has yet to be successfully commercialized.

Since 1991 when Japanese Patent Application JP06-029592 was filed, gas discharge lasers have evolved substantially. Modern transverse discharge lasers are now designed to produce a relatively high power output (having both a relatively high pulse energy and high pulse repetition rate) with relatively tight specifications on beam properties such as bandwidth and pulse-to-pulse energy stability, to name just a few. To achieve this performance, modern transverse discharge lasers typically include complex, highly engineered discharge chambers. For example, a relatively low impedance, low inductance current path geometry is typically provided in the chamber to conduct the extremely high peak currents that are generated by an electrical drive circuit to the electrodes. Also, the chamber may need to provide suitable heat transfer paths, for example, to prevent component overheating, and in particular, electrode overheating. In addition to heat transfer paths, the chamber may need to provide suitable gas flow paths to reduce gas flow turbulence and ensure that a fresh quantity of laser gas is positioned between the electrodes prior to the initiation of the next discharge. Concurrent with the above-described engineering constraints, the chamber may need to provide suitable component geometries which prevent or minimize the impact of reflected acoustic waves which can reach the discharge area and adversely affect properties of the output laser beam such as bandwidth, divergence, etc.

With the above considerations in mind, Applicants disclose an extendable electrode system for a gas discharge laser.

SUMMARY

Disclosed herein are systems and methods for extending one or both of the discharge electrodes in a transverse discharge laser chamber in which the electrodes are subject to a dimensional change due to erosion. Electrode extension can be performed to increase the chamber life, increase laser performance over the life of the chamber, or both. Operationally, the inter-electrode spacing may be adjusted to maintain a specific target gap distance between the electrodes or to optimize a specific parameter of the laser output beam such as bandwidth, pulse-to-pulse energy stability, beam size, etc.

As disclosed herein, control of the inter-electrode spacing may be effectuated in several different ways. In one implementation, the inter-electrode spacing may be visually observed and the observation used to move one or both of the electrodes. For example, a technician may manually instruct a laser system controller via keypad or graphic user interface to signal an actuator, which in turn, produces the desired inter-electrode spacing adjustment.

In another implementation, the inter-electrode spacing may be adjusted using a feedback loop. For example, a controller may be provided to monitor a device parameter and generate a control signal indicative of the parameter. For use with the controller, an actuator may be operably coupled with one or both of the electrodes, the actuator responsive to the control signal to move one or both of the electrodes and adjust the inter-electrode spacing. For this implementation, the parameter may be provided to the controller by an on-board measuring instrument or other laser component as described below. The parameter can include, but is not necessarily limited to wavelength, bandwidth, pulse-to-pulse energy stability, beam size, accumulated pulse count, average historical duty cycle, a measured relationship between discharge voltage and pulse energy, or combinations thereof.

In a particular implementation, a controller may be programmed to scan the inter-electrode spacing over a pre-determined spacing range. During the scan, a measuring instrument or other laser component may provide one or more parameter inputs to the controller allowing the controller to determine a relationship between the parameter and the inter-electrode spacing. From the relationship, the controller may deduce an optimum inter-electrode spacing and thereafter adjust the inter-electrode spacing accordingly.

Several mechanisms capable of being coupled to an electrode to produce an actuator-driven, electrode movement are disclosed herein. In one mechanism, a first elongated rigid member having sawtooth ramp structure and a second elongated rigid member having complimentary sawtooth ramp structure are provided. The ramp structures are aligned longitudinally and placed in contact with each other. The first rigid member may be attached to an electrode and the second rigid member attached to an actuator such that movement of the actuator translates the second rigid member in the direction of member elongation. With this structural arrangement, longitudinal movement of the second rigid member causes a movement of the first rigid member (and the attached electrode) in a direction normal to the direction of member elongation. Other electrode movement mechanisms are disclosed in further detail below including a cam-operated mechanism and a screw-operated mechanism.

For use in conjunction with one or more of the electrode movement mechanisms described above, a conductive, flexible member may be provided for electrically shielding moving parts and/or contact surfaces of the mechanism from the fields generated during an electrode discharge. For example, the flexible member may extend from a first flexible member edge that is attached to one of the electrodes for movement therewith to a second flexible member edge that is held fixed relative to the housing. In some cases, the flexible member may be formed with one or more convolutions that are aligned parallel to the direction of electrode elongation to impart flexibility to the member. In one embodiment, the second edge of the flexible member may be electrically connected to a plurality of so-called "current tines" which provide a low impedance path from the moveable electrode to a pulse power supply.

In another implementation, a movable electrode assembly for use in laser system includes a first electrode, a second electrode arranged opposite from the first electrode, the second electrode being spaced apart from the first electrode by a discharge gap and a discharge gap adjuster interfaced with at least one of the second electrode or the first electrode, the discharge gap adjuster configured to adjust the discharge gap.

In another implementation, a movable electrode assembly for integration into a housing of a laser system includes a first electrode having a discharge surface, a second electrode having a discharge surface, such that the discharge surface of the first electrode and the discharge surface of the second electrode face each other in a spaced apart setting that defines a desired discharge gap, and a mechanism for moveably adjusting the spaced apart setting toward the desired discharge gap.

In another implementation, a method of adjusting a discharge gap includes moving a first elongated member longitudinally relative to a second elongated member, the first elongated member having a first inclined face, the first inclined face being inclined longitudinally along the first elongated member, the second elongated member having a second inclined face, the second inclined face being inclined longitudinally along the second elongated member, the second inclined face being substantially complimentary to the first inclined face, wherein a second electrode is coupled to the first elongated member and a first electrode is opposite from the second electrode, the second electrode being separated from the first electrode by a discharge gap.

BRIEF DESCRIPTION OF THE DRAWINGS

The present invention will be readily understood by the following detailed description in conjunction with the accompanying drawings.

FIGS. 4C and 4D show perspective, simplified views of a rigid sawtooth structure and a complementary rigid sawtooth structure, respectively; FIGS. 4E and 4F show a moveable electrode viewed as seen along line 4E-4E in FIG. 1 with FIG. 4E showing the electrode in a retracted state relative to the electrode support bar and FIG. 4F showing the electrode in an extended state relative to the electrode support bar; and FIG. 4G shows a linkage including a push rod and pivoting lever for establishing a mechanical path between an actuator and a rigid sawtooth structure.

FIGS. 7C-7E show a moveable electrode viewed as seen along line 4E-4E in FIG. 1 with FIG. 7C showing a mechanism having a single drive screw, FIG. 7D showing a mechanism having two drive screws, and FIG. 7E showing a mechanism having a three drive screws.

DETAILED DESCRIPTION

Figure 1:
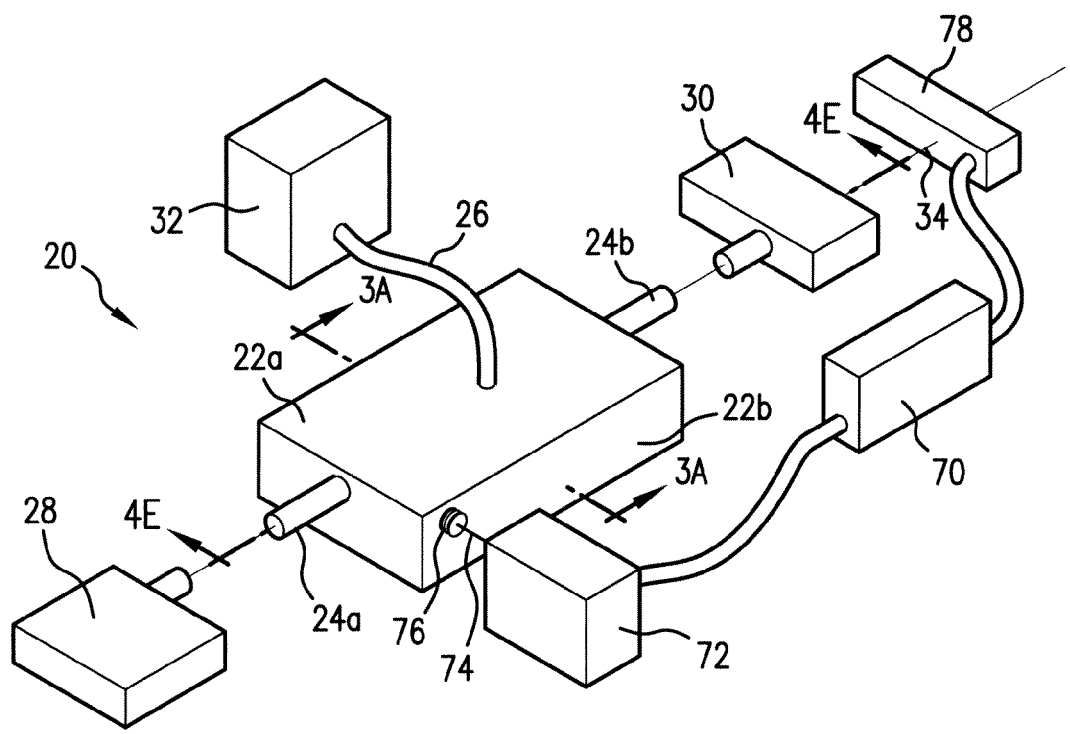
FIG. 1 shows a simplified, perspective, partially exploded view of a transverse discharge gas laser.

Referring initially to FIG. 1, a simplified, partially exploded view of portions of a transverse discharge gas laser device are shown and generally designated 20. For example, the device 20 may be a KrF excimer laser, an XeF excimer laser, an XeCl excimer laser, an ArF excimer laser, a molecular fluorine laser or any other type of transverse discharge gas laser known in the pertinent. As shown, the device 20 may include a two-part chamber housing 22a,b being formed of a chamber wall that may be made of a conductive, corrosion resistant material, e.g., nickel-plated aluminum. As further shown in FIG. 1, window assemblies 24a,b may be provided at each end of the chamber housing 22a,b to allow light to enter, exit and pass through the chamber housing 22a,b along a common beam path. With this structure, the hollow chamber housing 22a,b and window assemblies 24a,b may surround a volume which holds a laserable gas medium under pressure together with other components suitable to create a discharge in the medium. These other components may include, for example, a pair of discharge electrodes (not shown in FIG. 1), a fan to circulate the gas (not shown in FIG. 1), heat exchangers to cool the gas (not shown in FIG. 1), etc. It is to be appreciated that the chamber housing 22a,b may also be formed with a number of sealed inlets/outlets (not shown in FIG. 1), to allow gas to be introduced/extracted from the chamber, to allow conductors 26 to deliver an excitation voltage to the electrodes, etc.

In addition to the chamber, FIG. 1 shows that the device 20 may also include a beam reverser 28 and outcoupler 30 cooperatively arranged to form an optical cavity. For the device 20, the beam reverser 28 may be as simple as a flat, fully reflective mirror or as complex as a grating-based line-narrowing unit. It is to be appreciated that the use of a moveable electrode is not limited to the stable, standing wave cavity alluded to above. Instead, a transverse discharge gas laser chamber having one or more moveable electrodes may be employed within other optical arrangements such as a one-pass amplifier, multi-pass amplifier, traveling wave amplifier such as a ring amplifier, unstable cavities, etc.

Continuing with FIG. 1, the device 20 may also include a pulse power system delivering electrical pulses to electrodes located within the chamber housing 22a,b via conductors 26. Although the description that follows will be provided with reference to a pulsed laser device, it is to be appreciated that some or all of the concepts disclosed herein may be equally applicable to continuous discharge gas laser devices which have electrodes that suffer a dimension change due to erosion or some other phenomenon. FIG. 1 further illustrates that during operation of the device 20, a laser beam 34 is created which exits the optical cavity via the outcoupler 30.

Figure 2:
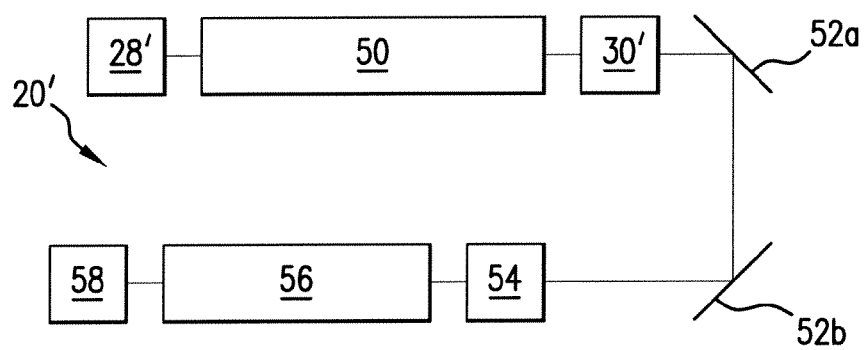
FIG. 2 shows a simplified schematic view of a multi-stage laser system.

FIG. 2 shows a multi-stage gas discharge laser device, generally designated 20' to illustrate that the inter-electrode spacing may be independently (or in some cases dependently) adjusted in one, both or all of the laser device chambers of a multi-stage device. For example, the first stage may be either a power oscillator, PO or a master oscillator, MO. Typically, an oscillator is referred to as an MO if more than about a third of the total laser output power is produced in the initial oscillation cavity and is referred to as a PO if less than about a third of the total output power is produced in the initial oscillation cavity. Subsequent stage(s) may be, for example, a one-pass power amplifier, a multi-pass power amplifier, a power oscillator or a traveling wave amplifier such as a ring amplifier. It is to be appreciated that a multi-stage device may include some or all of the components shown in FIG. 2, depending on the configuration. The components shown in FIG. 2 include a beam reverser 28', first stage chamber 50, first stage outcoupler 30', turning optics 52a,b, incoupler 54, second stage chamber 56 and second stage outcoupler 58.

Inter-Electrode Spacing Adjustment

Figure 3A:
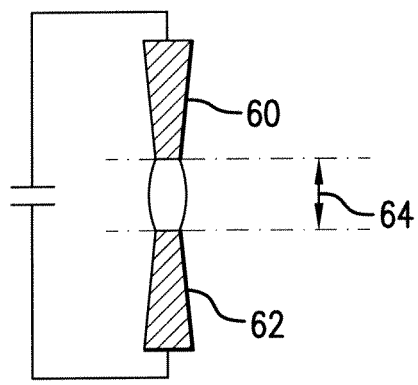
FIGS. 3A-D each schematically show a pair of electrodes viewed as seen along line 3A-3A in FIG. 1 with FIG. 3A showing the electrodes in their initial positions prior to erosion, FIG. 3B showing the electrodes after erosion, FIG. 3C showing the electrodes after erosion and after one of the electrodes has been moved to adjust the inter-electrode spacing and FIG. 3D showing the case where one electrode is moved into the initial electrode gap to accommodate erosion of the other electrode.
Figure 3B:
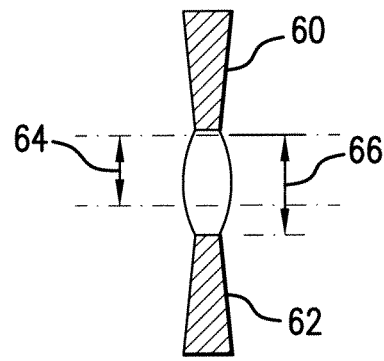
Figure 3C:
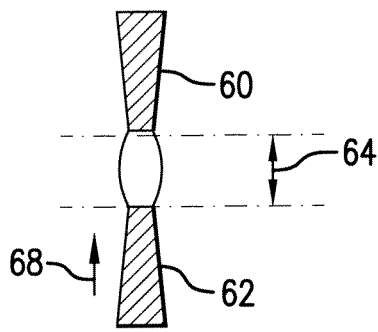
Figure 3D:
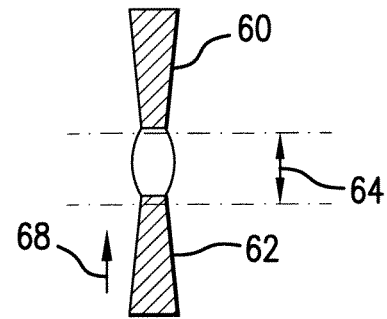

FIGS. 3A-D illustrate how electrode dimensional changes associated with erosion can affect the inter-electrode spacing and how the movement of one electrode relative to the other may re-establish a more desirable inter-electrode spacing. In more detail, FIG. 3A shows the initial electrode positions (prior to erosion) with electrode 60 spaced from electrode 62 to establish an initial inter-electrode spacing 64. FIG. 3B illustrates the electrodes 60, 62 after significant electrode erosion has occurred resulting in inter-electrode spacing 66 (note initial inter-electrode spacing 64 is shown for reference purposes). FIG. 3C illustrates the electrodes 60, 62 after significant electrode erosion has occurred (FIG. 3B) and after electrode 62 has been moved in the direction of arrow 68 resulting in an inter-electrode spacing that is close to the initial inter-electrode spacing 64. FIG. 3D illustrates that the electrode 62 may be moved to a position where its discharge surface extends into the initial electrode gap (illustrated by the dotted lines) to accommodate erosion of electrode 60.

FIGS. 3A-D illustrate the case of asymmetric electrode erosion. In particular, it is clear from FIG. 3B that electrode 62 has eroded about 10 times more than electrode 60. For this case, movement of electrode 62 may be sufficient by itself (movement of electrode 60 may not be required) to provide the desired inter-electrode spacing correction. This type of asymmetric electrode wear is common in certain types of transverse discharge gas lasers such as some high-power, high repetition rate, excimer lasers where the anode (the electrode electrically connected to the housing) typically erodes at a rate much greater than the cathode. Although FIGS. 3A-D illustrate asymmetric electrode erosion, it is to be appreciated that one or both of the electrodes may be moved to provide an inter-electrode spacing correction for a device which experiences symmetric electrode wear. For systems where both electrodes are moveable, the electrodes may be moved to set a desired inter-electrode spacing and/or may be used to move the discharge region relative to the other optics and apertures in the system. Thus, the electrode movement system may be used as an alignment tool to adjust the beam footprint relative to one or more system apertures/optics.

Inter-Electrode Spacing Control

For the device 20 shown in FIG. 1, the control of the inter-electrode spacing may be effectuated in several different ways. In perhaps the simplest implementation, the inter-electrode spacing may be visually observed, for example by looking through one of the windows 24a,b, and the observation used to move one or both of the electrodes. For example, a technician may use the observation to instruct a laser system controller 70 via keypad or graphic user interface (or any other controller input device known in the art) to signal an actuator 72, which in turn, may drive a mechanism (see description below) to produce the desired inter-electrode spacing adjustment. For this purpose, a linkage 74 may pass through the wall of the chamber housing 22a,b, and a flexible bellows 76 (or other suitable arrangement known in the pertinent art) may be provided to prevent laser gas from exiting the chamber housing 22a,b. It is to be appreciated that portions (memory, processor, etc) or all of the controller 70 may be integral with (e.g. shared) or separate from a main laser system controller which controls other laser functions such as discharge voltage, timing, shutter activation, etc.

In another implementation, the inter-electrode spacing may be adjusted based on a monitored device parameter. For example, the device 20 may monitor one or more device parameters such as accumulated pulse count, average historical duty cycle, wavelength, gas pressure, running voltage, bandwidth, pulse-to-pulse energy stability (sometimes referred to as sigma), beam size, or a measured relationship between discharge voltage and pulse energy. The device parameter(s) may be selected to predict the extent of electrode erosion (pulse count, average historical duty cycle, etc.) and/ or may be selected to tune the laser device to produce an output beam having a desired characteristic (bandwidth, pulse-to-pulse energy stability, etc.).

As shown in FIG. 1, one or more of these device parameters may be monitored by measuring a property of the output laser beam 34 using a measuring instrument 78. A control signal indicative of the device parameter may then be output from the instrument 78 and transmitted to the controller 70, which in turn, provides a signal to the actuator 72. Some device parameters, such as accumulated pulse count, average historical duty cycle, etc, may be provided to the controller 70 or generated within the controller 70 without the use of a measuring instrument. Thus, in at least some implementations envisioned herein, a measuring instrument 78 may not be required. One the other hand, more than one parameter (i.e., a plurality of device parameters) may be communicated to, or developed within, the controller 70 for processing in an algorithm to determine an appropriate inter-electrode spacing adjustment.

In a particular implementation, a controller may be programmed to scan the inter-electrode spacing over a pre-determined spacing range. Thus, the inter-electrode spacing may be adjusted either continuously or incrementally while the laser is operating and outputting laser pulses. During the scan, a measuring instrument or other laser component may provide one or more parameter inputs to the controller allowing the controller to determine a relationship between the parameter(s) and the inter-electrode spacing. From the relationship, the controller may then deduce an optimum inter-electrode spacing and thereafter adjust the inter-electrode spacing accordingly.

Inter-Electrode Spacing Mechanisms

Figure 4A:
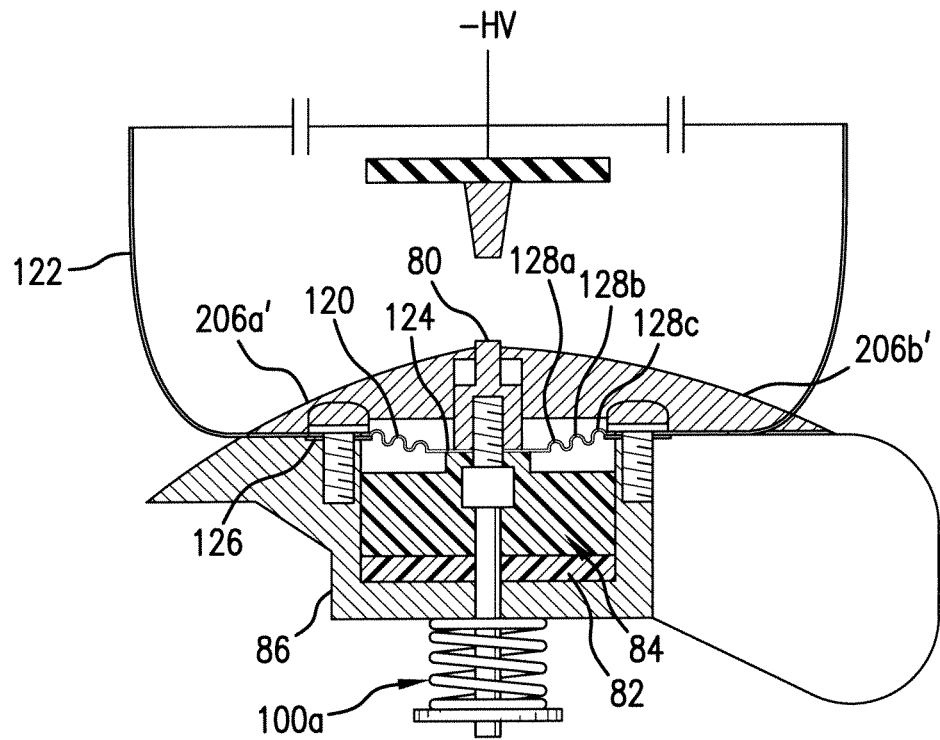
FIGS. 4A-G show the components of a mechanism that may be coupled to an electrode to produce an actuator-driven, electrode movement, where FIGS. 4A and 4B schematically show a pair of electrodes viewed as seen along line 3A-3A in FIG. 1 with FIG. 4A showing the electrode in a retracted state relative to the electrode support bar and FIG. 4B showing the electrode in an extended state relative to the electrode support bar.
Figure 4B:
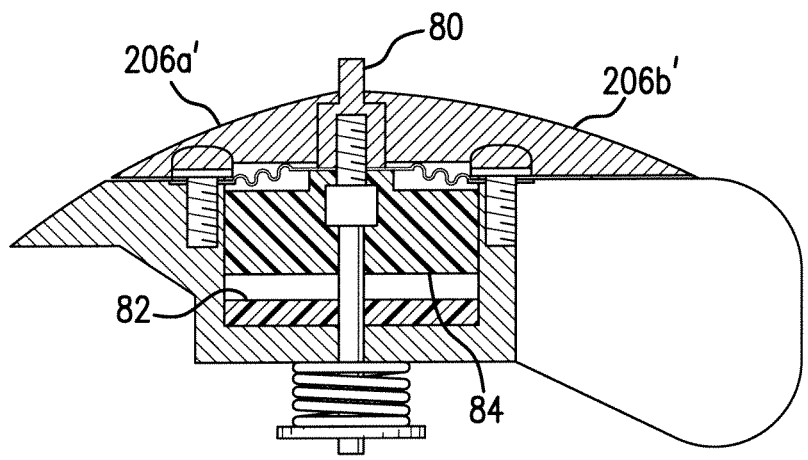

FIGS. 4A-E show the components of a first mechanism that may be coupled to an electrode 80 to produce an actuator-driven, electrode movement. For the mechanism, a first elongated rigid member 82 having sawtooth ramp structure and a second elongated rigid member 84 having complimentary sawtooth ramp structure are disposed within a channel formed in an electrode support bar 86, as shown in FIG. 4A (which shows the electrode 80 in a fully retracted position) and 4B (which shows the electrode 80 in a fully extended position). For the device, the electrode support bar 86 is typically elongated, like the electrode and is affixed at its ends to the wall of the housing 22a,b (see FIG. 1).

Figure 4C:
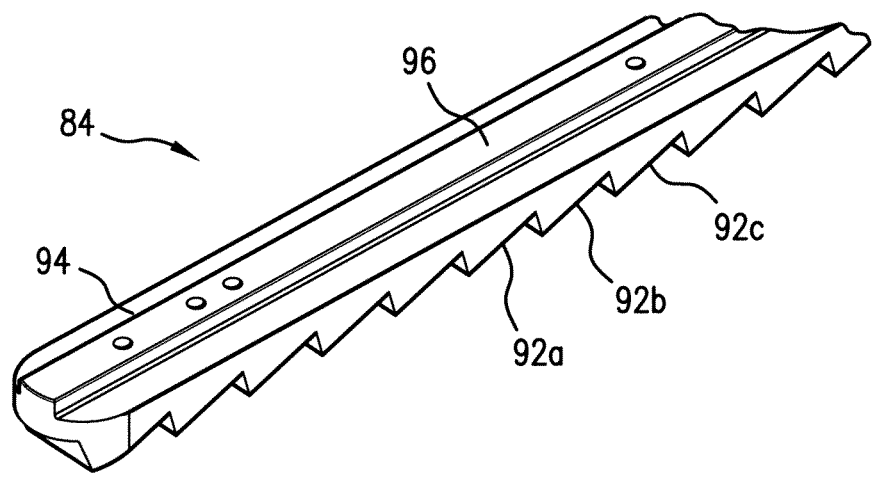
Figure 4D:
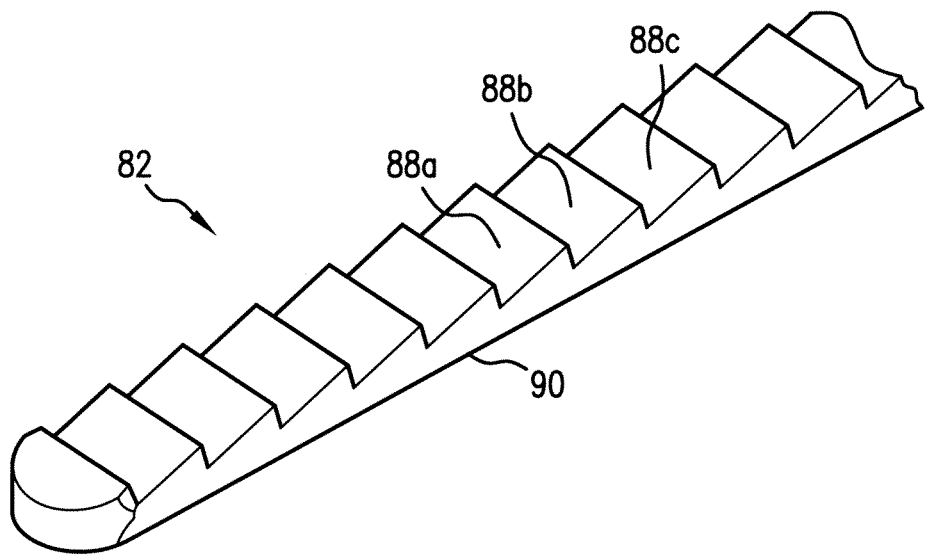

Perspective views of elongated rigid members 82 and 84 are shown in FIGS. 4C and 4D, respectively. As seen there, elongated rigid member 82 is formed with a plurality of inclined, parallel surfaces, (of which surfaces 88a-c have been labeled) and an opposed flat surface 90. Somewhat similarly, elongated rigid member 82 is formed with a plurality of complementary, inclined, parallel surfaces, of which surfaces 92a-c have been labeled) and an opposed flat surface 94 which includes a raised flat portion 96 onto which the electrode 80 may be affixed (see FIGS. 4A and 4E). Although FIG. 4C illustrates a rigid member 82 having about 20 inclined surfaces for a 30 cm electrode, it is to be appreciated that more than 20 and as few as one inclined surface may be used.

Figure 4E:
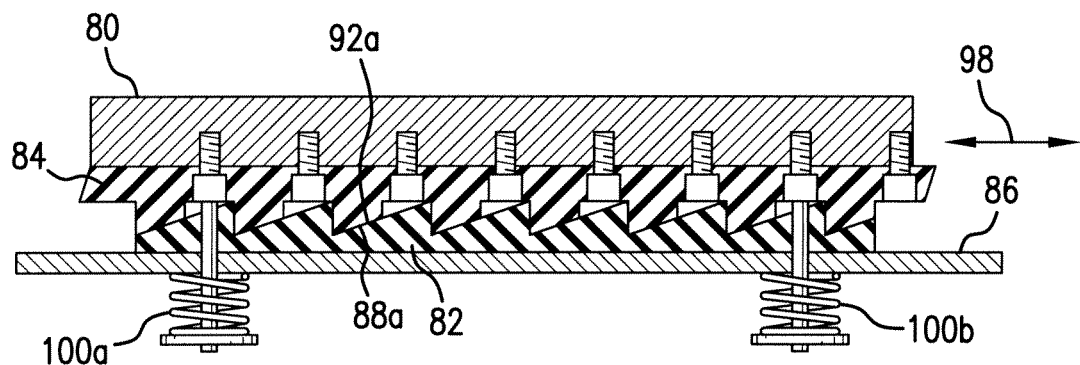
Figure 4F:
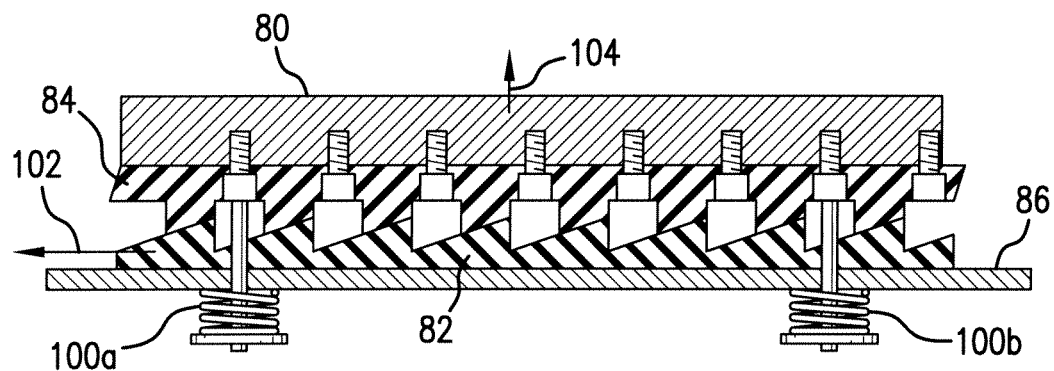

For the mechanism, as best seen in FIGS. 4E and 4F, the rigid members 82, 84 are aligned longitudinally (i.e., each aligned parallel to the direction of electrode elongation shown by arrow 98) and placed in contact with each other. Specifically, each inclined surface 88a-c of rigid member 82 is placed into sliding contact with a corresponding inclined surface 92a-c of rigid member 84. As further shown in FIG. 4E, spring assemblies 100a,b may be employed to maintain a preselected contact pressure between the inclined surfaces 88a-c of rigid member 82 and inclined surfaces 92a-c of rigid member 84.

FIGS. 4E and 4F illustrate the movement of electrode 80 in response to a movement of the elongated member 82 relative to the electrode support bar 86 with FIG. 4E showing the electrode 80 in a fully retracted position and 4F showing the electrode 80 in an extended position. Comparing FIG. 4E with 4F, it can be seen that a movement of elongated rigid member 82 relative to the electrode support bar 86 in the direction of arrow 102 will result in a movement of the electrode 80 and elongated rigid member 84 in the direction of arrow 104. Similarly, movement of elongated rigid member 82 relative to the electrode support bar 86 in the direction opposite arrow 102 will result in a movement of the electrode 80 and elongated member 84 in the direction opposite arrow 104 with the spring assemblies maintaining contact between the inclined surfaces 88a-c, 92a-c.

Figure 4G:
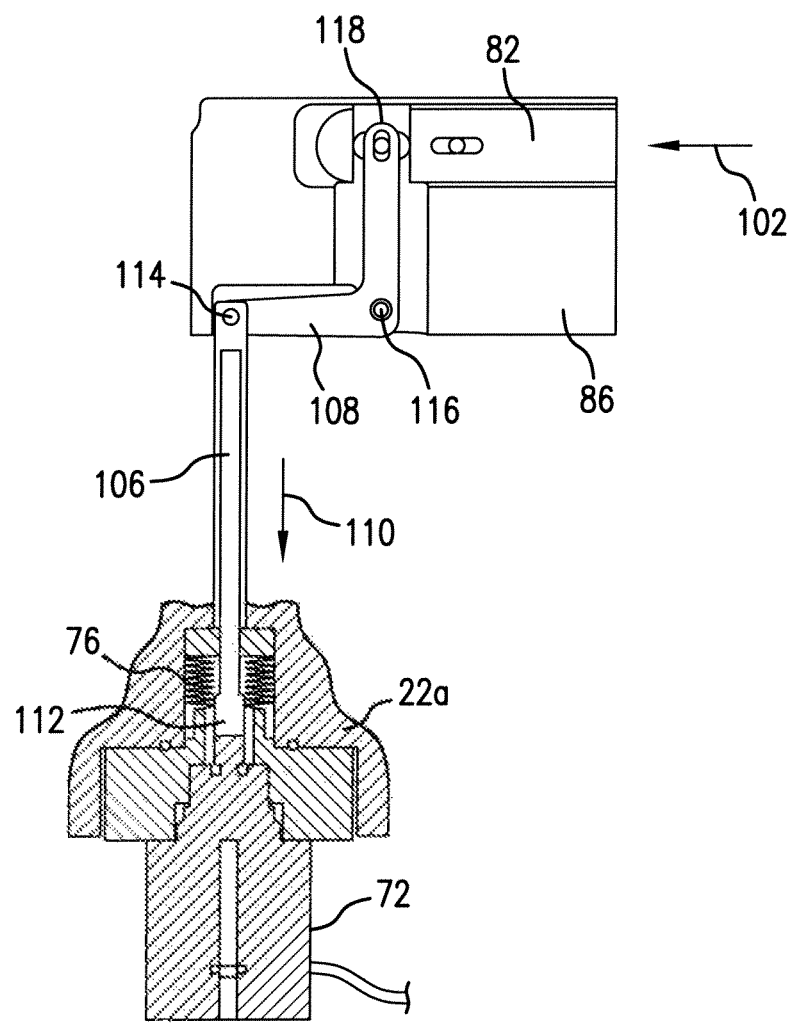

FIG. 4G shows a mechanism linkage which includes a substantially straight push rod 106 and an L-shaped pivoting lever 108 for establishing a mechanical path between the actuator 72 and rigid sawtooth structure 82. With this arrangement, movement of the push rod 106 in the direction of arrow 110 will cause the rigid sawtooth structure 82 to move in the direction of arrow 102 (arrow 102 also shown in FIG. 4F). This in turn will cause a movement of the electrode 80 in the direction of arrow 104 as shown in FIG. 4F. Note: the rigid member 82 is disposed in a similarly sized channel formed in the support bar 86 and as such is laterally constrained therein (see FIG. 4A).

FIG. 4G further shows that the actuator 72 may be affixed to the wall of the chamber housing 22a and operable attached to a first end 112 of the push rod 106. Push rod 106 then extends through an opening in the wall of the chamber housing 22a to a second push rod end 114 which is disposed inside the chamber. Flexible bellows 76 may be provided to maintain gas pressure within the chamber while allowing translation of the push rod 106. Also shown, second push rod end 114 may be pivotally attached, for example using a pin/cotter key arrangement (or any similarly functioning arrangement known in the art), to the L-shaped lever 108, which in turn is pivotally attached near its midsection to the electrode support bar 86 at pivot point 116. End 118 of lever 108 may be pivotally attached to rigid member 82, as shown. A simpler design may be employed in which the push rod is aligned parallel to the rigid member and attached directly thereto, however, use of the L-shaped lever 108 allows for motion amplification/de-amplification depending on the relative lengths of the lever arms. If desired, the actuator may be replace by a drive screw (not shown) or similar component allowing for manual adjustment of the inter-electrode spacing. Another alternative to the push rod/lever system is to use a pulley/cable system to move the rigid member 82 within channel. For this alternative, the member 82 may be biased away from the pulley using a spring attached to the support bar.

Flexible Conductive Member

Figure 5:
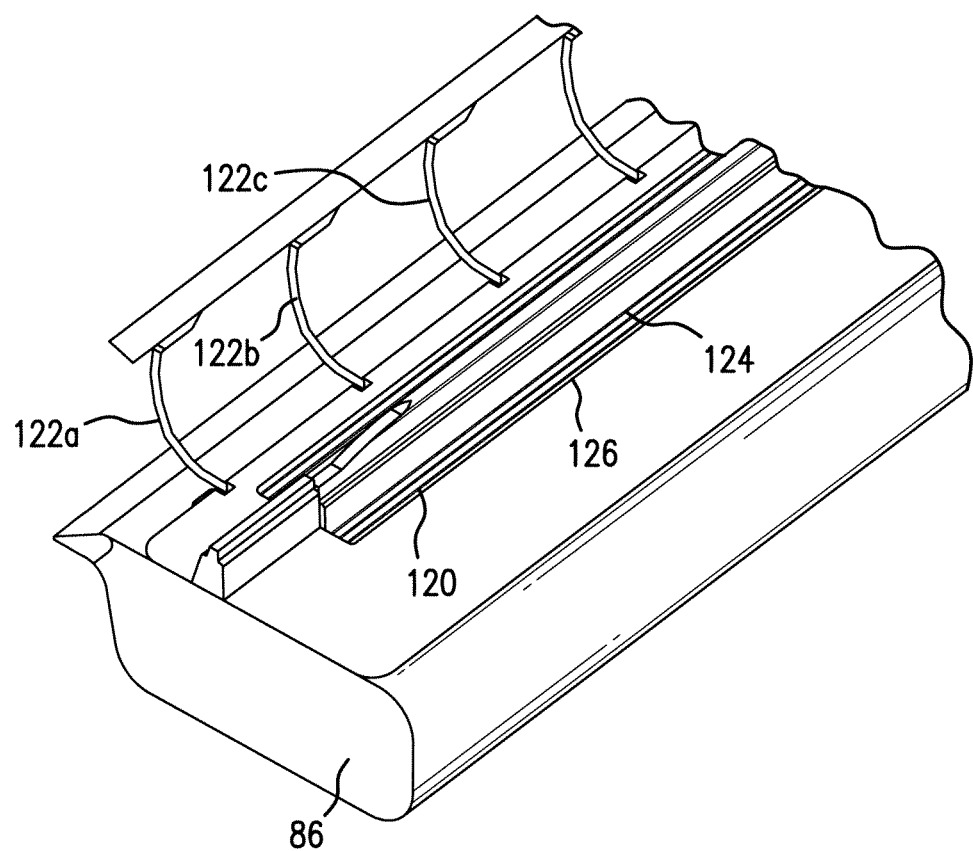
FIG. 5 shows a perspective view of a moveable electrode assembly illustrating a flexible conductive member electrically connecting the moveable electrode to a plurality of current return tines.

As best seen cross-referencing to FIGS. 4A and 5, a conductive, flexible member 120 may be provided for electrically shielding some or all of the inter-electrode spacing mechanism components and/or electrically connecting the electrode 80 to the current return tines 122a-c and/or constraining the electrode 80 and rigid member 84 from longitudinal movement (i.e., movement in the direction of arrow 98 in FIG. 4E) and/or to provide a thermally conductive path allowing heat to flow from the electrode to the support bar. In some applications, contacting surfaces of the electrode spacing mechanism may arc, and in extreme cases weld together, if unshielded in the presence of the electric fields generated by discharge.

As shown in FIGS. 4A and 5, the flexible member 120 may have a first flexible member edge 124 that is attached to electrode 80 and/or rigid member 84 for movement therewith (note: for the embodiment shown, the edge 124 is clamped between electrode 80 and rigid member 84). Typically, the flexible member 120 is made of a conductive metal such as copper or brass allowing the flexible member 120 to conduct heat and/or electricity from the electrode 80 to the support bar 86/current return tines 122a-c.

FIGS. 4A and 5 also show that the flexible member 120 may have a second edge 126 that is attached to the support bar 86 and thus, may be held fixed relative to the housing 22a (see FIG. 1). FIG. 4A further illustrates that the edge 126 of the flexible member 120 may be electrically connected to the current return tines 122 establishing an electrical path from the electrode 80 to the tines 122. The current tines, in turn, provide a relatively low impedance path from the flexible member 120 to a pulse power system 32 (shown in FIG. 1). For the device shown, the flexible member 120 may be formed with one or more convolutions 128a-c, e.g. bends, that are aligned parallel to the direction of electrode elongation (i.e. the direction of arrow 98 in FIG. 4E) to impart flexibility to the member. With this arrangement, the flexible member 120 may be described as having a planar, corrugated shape.

As described above, the flexible member 120 may function to electrically shield some or all of the inter-electrode spacing mechanism components and/or electrically connect the electrode 80 to the current return tines 122a-c and/or constrain the electrode 80 and rigid member 84 from longitudinal movement. Although a flexible member 120 may be designed to achieve all of these functions, it is to be appreciated that some applications may not require all three functions. For example, for some discharge power levels, shielding may not be required. Moreover, one or more of the three functions may be performed by another component. For example, longitudinal constraint of the electrode 80 may be performed in a different manner allowing a flexible member 120 which lacks the strength necessary to constrain the electrode 80. Other arrangements may be provided which perform one or more of the functions described above including a member whose flexibility is derived from its thickness, a plurality of spaced apart flexible members and tines having one or more convolutions.

One feature of the structural arrangement shown in FIGS. 4A-G and 5 is that the inter-electrode spacing can be adjusted without moving the electrode support bar 86 relative to the other laser components, e.g., fan, housing, etc.). This allows a close tolerance between the support bar 86 and other structures to be maintained. For example, in some applications, a close tolerance between the support bar 86 and a fan (not shown) may be maintained allowing the fan to run more efficiently.

Another feature of the structural arrangement shown in FIGS. 4A-G and 5 is that a substantial heat transfer path is provided between the electrode 80 and the support bar 86. In particular, the relatively large contact area between the rigid member 82 and rigid member 84 and the relatively large contact area between the rigid members 82, 84 and the support bar cooperate to provide a substantial heat transfer path. For some applications, this path may be useful in preventing overheating of the electrode 80.

Another feature of the structural arrangement shown in FIGS. 4A-G and 5 is that it maintains a relatively good parallelism between electrodes over the range of electrode movements.

Figure 6A:
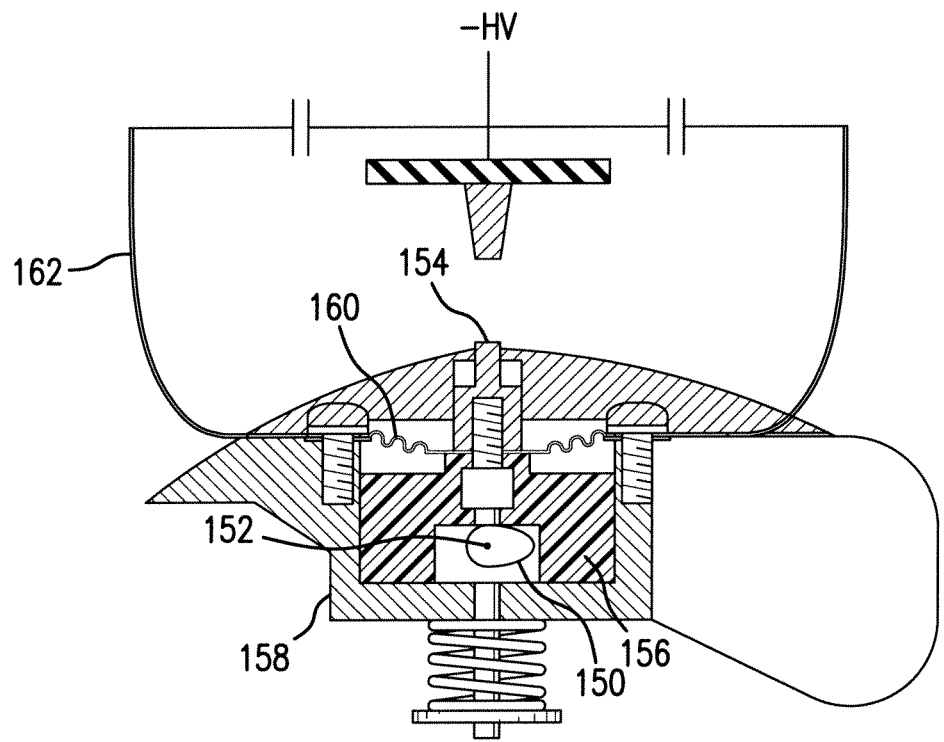
FIGS. 6A and 6B show the components of another mechanism having a camshaft that may be coupled to an electrode to produce an actuator-driven, electrode movement, where FIGS. 6A and 6B schematically show a pair of electrodes viewed as seen along line 3A-3A in FIG. 1 with FIG. 6A showing the electrode in a retracted state relative to the electrode support bar and FIG. 6B showing the electrode in an extended state relative to the electrode support bar.
Figure 6B:
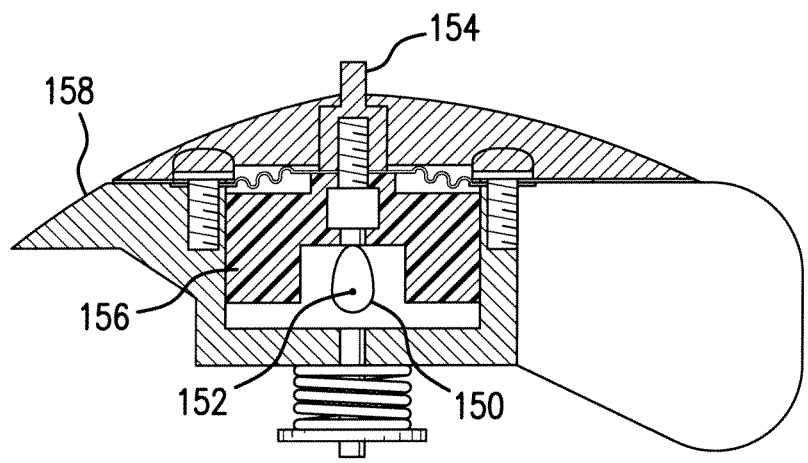

FIGS. 6A and 6B show an alternative mechanism in which a camshaft 150 may be rotated about a rotation axis 152 (which may be generally parallel to the direction of electrode elongation) to provide electrode extension with FIG. 6A showing the electrode 154 in a fully retracted position and 6B showing the electrode 154 in an extended position. For the mechanism, the camshaft 150 may be in direct contact with the electrode 154 (with or without a thermally conductive rigid member establishing a heat path from the electrode 154 to the support bar 158) or, as shown, a thermally conductive rigid member 156 may be interposed between the electrode 154 and camshaft 150 and used to conduct heat from the electrode 154 to the support bar 158. For the mechanism shown in FIG. 6, a flexible member 160 (as described above may be used to electrically shield some or all of the inter-electrode spacing mechanism components and/or electrical connect the electrode 154 to the current return tines 162 and/or provide a heat conduction path from the electrode 154 to the support bar 158. For the device, the camshaft 150 may be rotated manually or by an energized actuator and may be controlled by any of the techniques/structural arrangements described above.

Figure 7A:
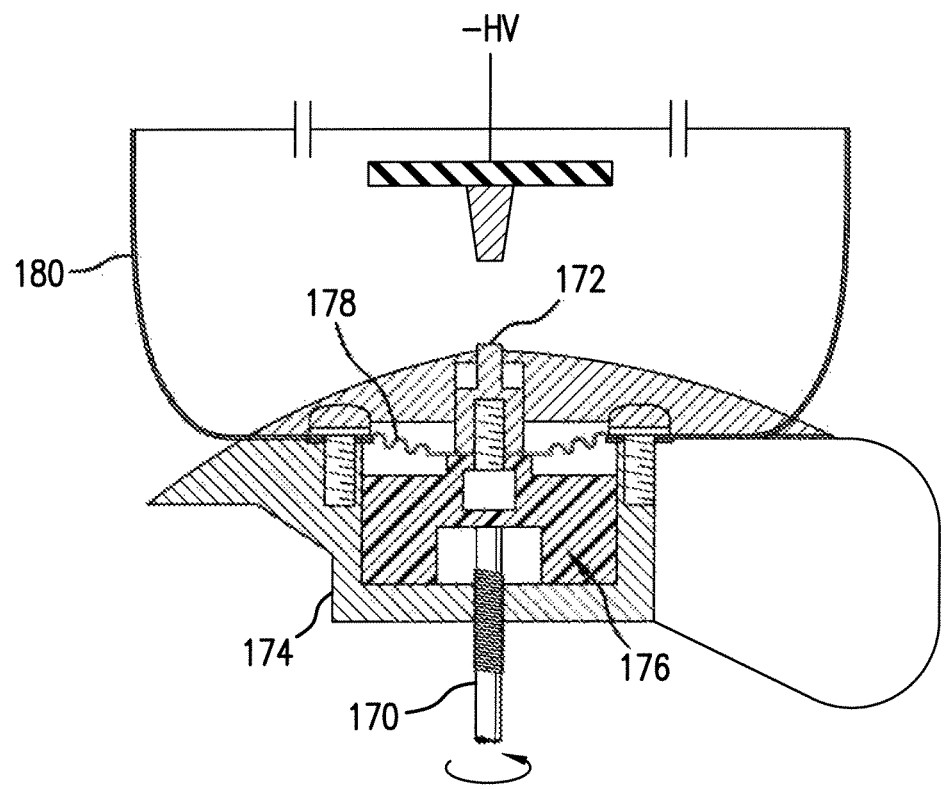
FIGS. 7A-E show the components of drive screw mechanisms that may be coupled to an electrode to produce an actuator-driven, electrode movement, where FIGS. 7A and 7B schematically show a pair of electrodes viewed as seen along line 3A-3A in FIG. 1 with FIG. 7A showing the electrode in a retracted state relative to the electrode support bar and FIG. 7B showing the electrode in an extended state relative to the electrode support bar.
Figure 7B:
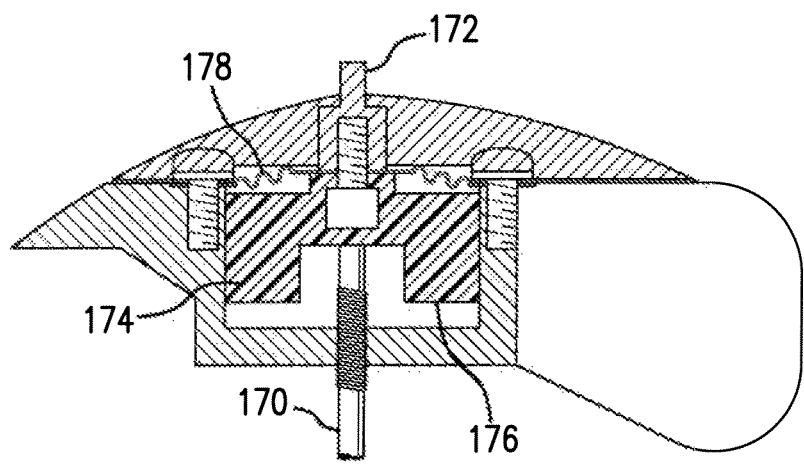

FIG. 7A-7E show alternative mechanisms which include one or more drive screws 170 to provide electrode extension with FIG. 7A showing the electrode 172 in a fully retracted position and 7B showing the electrode 172 in an extended position. For the mechanism, the drive screw(s) 170 may be in direct contact with the electrode 172 (with or without a thermally conductive rigid member establishing a heat path from the electrode 172 to the support bar 174) or, as shown, a thermally conductive rigid member 176 may be interposed between the electrode 172 and drive screw(s) 170 and used to conduct heat from the electrode 172 to the support bar 174.

Figure 7C:
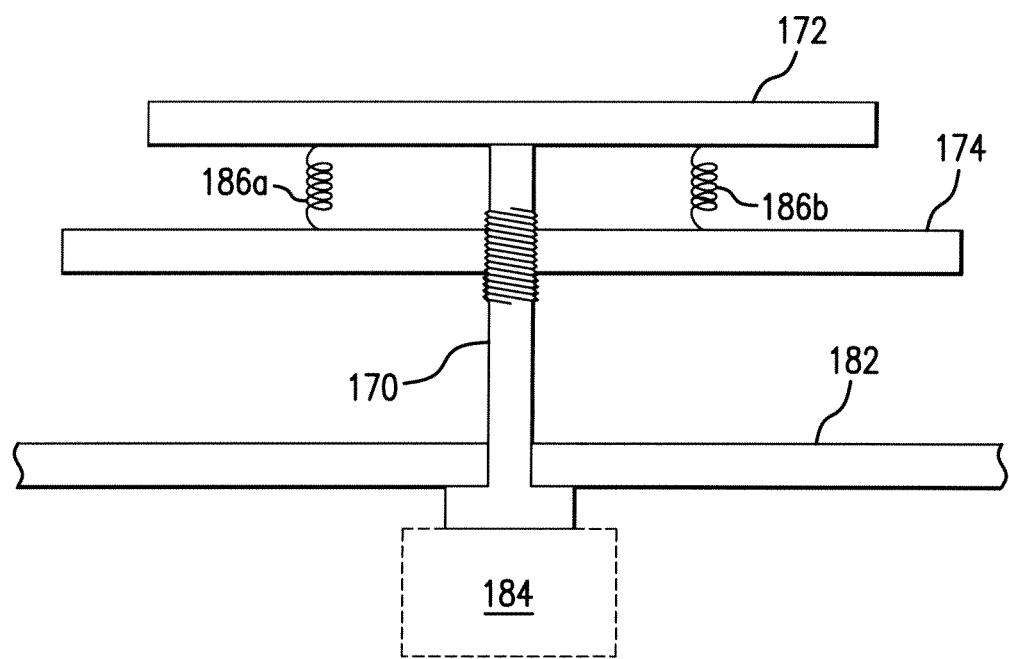

For the mechanism shown in FIGS. 7A-7E, a flexible member 178 (as described above may be used to electrically shield some or all of the inter-electrode spacing mechanism components and/or electrical connect the electrode 172 to the current return tines 180 and/or provide a heat conduction path from the electrode 172 to the support bar 174. Cross-referencing FIGS. 7A and 7C, it may be seen that the drive screw (s) 170 may extend through the wall 182 and be threaded through a prepared hole (i.e., drilled, reamed and tapped) in the support bar 174. Alternatively, a prepared hole may be provided in the wall 182 or some other structure or a nut (not shown) may be affixed to the wall 182 or support bar 174. A flexible bellows as described above (not shown) may be employed at the wall 182 to prevent gas leakage from the chamber. For these mechanisms, each drive screw 170 may be rotated manually (from outside the chamber) or by an energized actuator 184 (shown with dashed lines to indicate an optional component) and may be controlled using one or more of the techniques/structural arrangements described above. Springs 186a,b may be provided to bias the electrode 172 relative to the support bar 174 as shown in FIG. 7C.

Figure 7D:
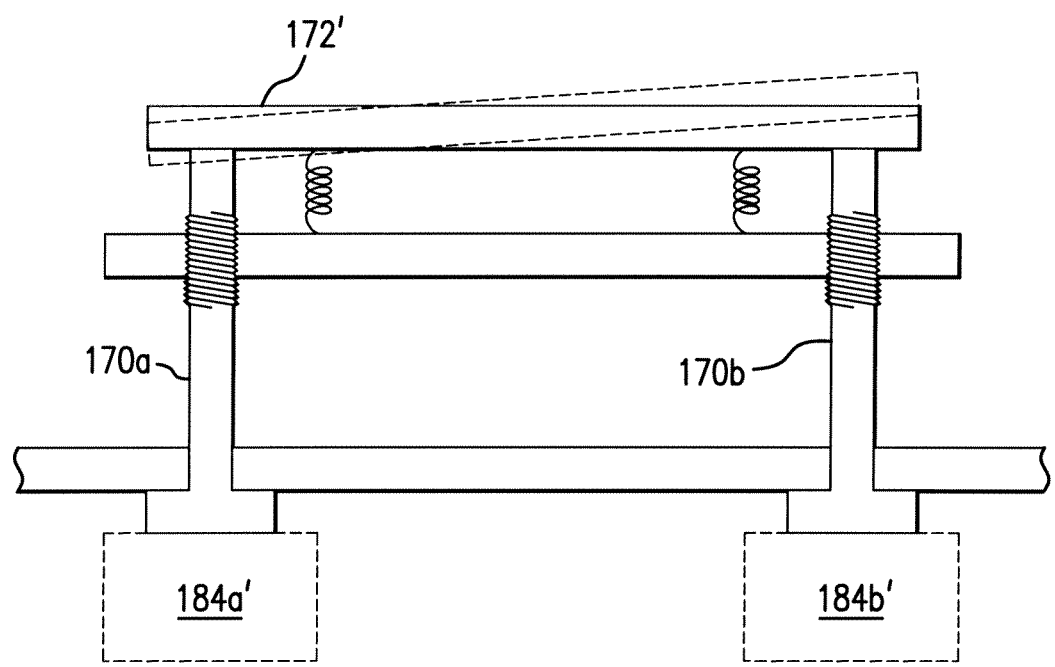

FIG. 7D illustrates a mechanism having two drive screws 170a,b that are spaced apart along the length of the electrode 172' with each drive screw 170a, 170b independently rotatable manually (from outside the chamber) or by energized actuators 184a', 184b', respectively (shown with dashed lines to indicate an optional component).

Figure 7E:
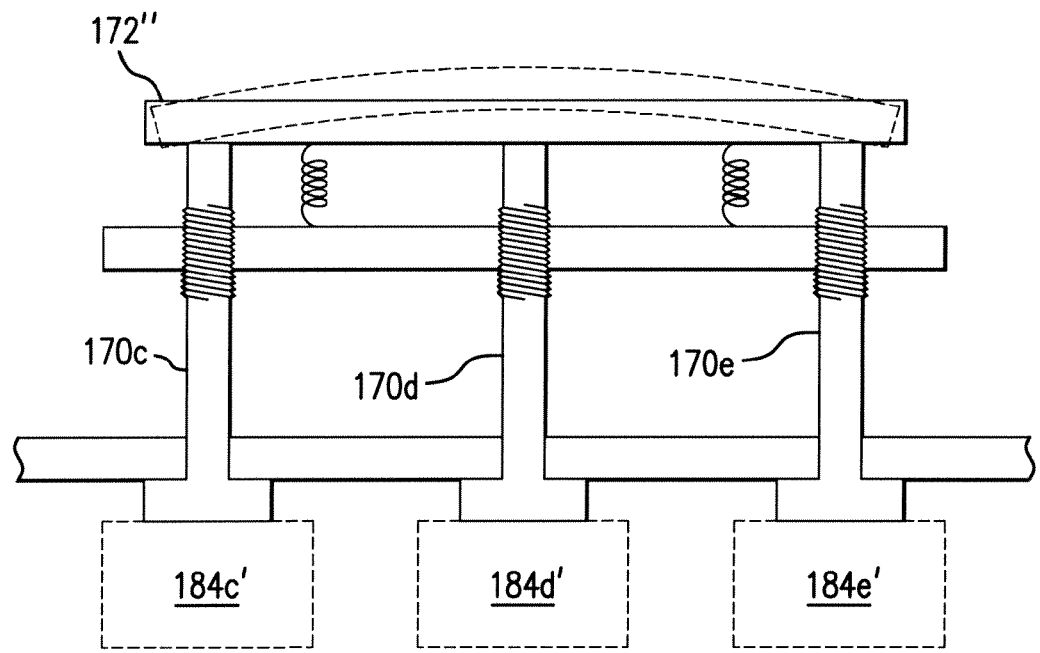

FIG. 7E illustrates a mechanism having three drive screws 170c,d,e that are spaced apart along the length of the electrode 172" with each drive screw 170c,d,e independently rotatable manually (from outside the chamber) or by energized actuators 184*c'*, *d'*, *e'*, respectively (shown with dashed lines to indicate an optional component).

For the mechanisms having two or more drive screw(s) 170 (FIGS. 7D and 7E), each of the drive screws may be independently adjusted to adjust inter-electrode parallelism and/or inter-electrode spacing. Specifically, the drive screws may be independently adjusted until the electrode 172" is parallel to the other electrode in the discharge pair (dotted lines in FIG. 7D showing an unaligned electrode and solid lines showing an electrode after alignment into parallel with another electrode).

For mechanisms having three or more drive screw(s) 170 (FIG. 7E), each of the drive screws 170 may be independently adjusted to adjust electrode parallelism (as described above) and/or electrode curvature and/or inter-electrode spacing. Specifically, the drive screws may be independently adjusted until the electrode 172" has a desired curvature such as straight or having a curvature matching the other electrode (dotted lines in FIG. 7D showing a non-desired curvature and solid lines showing an electrode after a curvature adjustment).

Movable Flow Guides

Figure 8A:
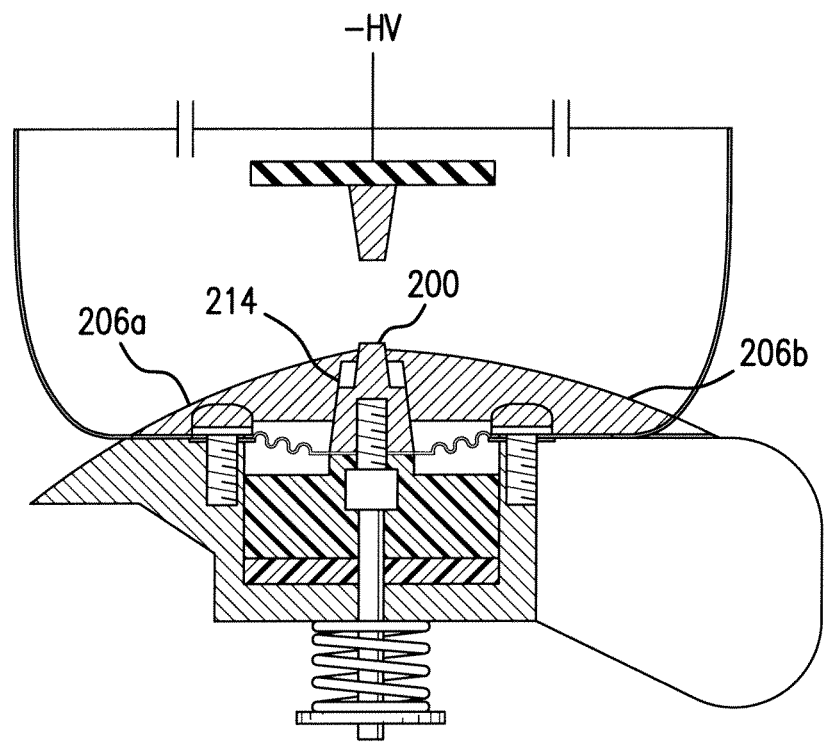
FIGS. 8A and 8B show the components of a device having moveable flow guides to accommodate extension of electrodes having non-parallel sidewalls, where FIGS. 8A and 8B schematically show a pair of electrodes viewed as seen along line 3A-3A in FIG. 1 with FIG. 8A showing the electrode in a retracted state relative to the electrode support bar and FIG. 8B showing the electrode in an extended state relative to the electrode support bar.
Figure 8B:
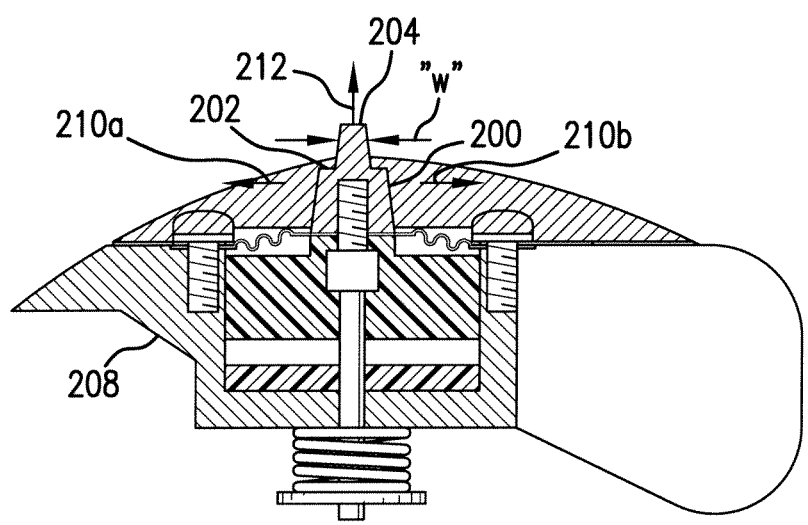

Although the electrode 80 shown in FIG. 4A has substantially straight, parallel sidewalls, it is to be appreciated that other electrode shapes may be used in the devices described herein. For example, FIGS. 8A and 8B show an electrode 200 having a tapered construction (in a plane normal to the direction of electrode elongation) in which the electrode width, 'w', decreases gradually from the electrode base 202 to the initial discharge surface 204. Other electrode designs can include an hourglass shape (not shown) in which the electrode width decreases from the base to a minimum and increases thereafter to the initial discharge surface.

FIGS. 8A and 8B also show that flow guides 206*a,b*, which may be made of an insulating ceramic material may be disposed surrounding the electrode 200 on each side to control the flow of gas over the tip of the electrode 200 and prevent the discharge from striking metal structures adjacent to the electrode 200. For the case of electrodes having parallel sidewalls (FIG. 4A) these guides may be affixed to the support bar and may remain stationary with respect thereto. Comparing FIG. 4A to 4B, it can be seen that extension of the electrode 80 with parallel sidewalls does not affect the spacing between the electrode sidewalls and stationary flow guides 206*a'*, 206*b'*. On the other hand, for electrodes having non-parallel sidewalls, such as electrode 200 in FIG. 8A, electrode extension may affect the spacing between the electrode sidewalls and stationary flow guides 206*a,b*.

FIGS. 8A and 8B illustrate an arrangement in which the flow guides 206*a,b* are moveable attached to the support bar 208 allowing the flow guides 206*a,b* to move apart (in the direction of arrows 210*a,b* from one another as the electrode 200 is extended (in the direction of arrow 212). To effectuate this flow guide movement, each flow guide 206*a,b* is form with a surface 214 that contacts the electrode 200 and is inclined at an angle relative to the direction of electrode movement (arrow 212) For the arrangement shown, one or more springs (not shown) may be provided to bias each flow guide 206*a,b* toward the electrode 200.

Electrode End Contour

Figure 9:
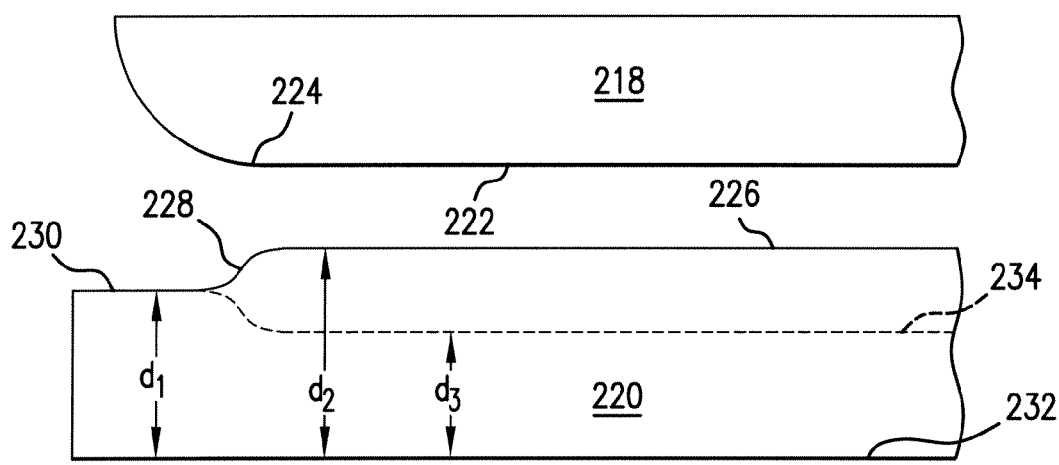
FIG. 9 shows a moveable electrode viewed as seen along line 4E-4E in FIG. 1 having an electrode end contour to accommodate electrode extension.

FIG. 9 shows a pair of electrodes 218, 220 and illustrates an end contour for a moveable electrode 220. As shown, electrode 218 is formed with a relatively flat portion 222 where discharge is desired and begins to curve away from the discharge region at point 224. Electrode 220 is shown with the solid line indicating its initial electrode shape and the dashed line indicating it end-of-life shape. As shown, the electrode 220 is initially formed with a relatively flat portion 226 where discharge is desired, a curved transition section 228 and a second flat section 230. As shown, the flat section 230 may be spaced at a distance 'd.sub.1' from the electrode base 232, the beginning-of-life flat section 226 may be spaced at a distance 'd.sub.2' from the electrode base 232, and the end-of-life flat section 234 may be spaced at a distance 'd.sub.3' from the electrode base 232, with d.sub.2>d.sub.1>d.sub.3. In a particular embodiment, the electrode 220 is formed with d.sub.1=d.sub.3+n(d.sub.2−d.sub.3), where n is typically in the range of about 0.25 to 0.75, placing the flat section 230 between the average height of the electrode 220 over the electrode's life. For example, d.sub.2−d.sub.3 may be about 3 mm. One feature of the arrangement shown is that it confines the discharge to a selected discharge region (ending near point 224) over the life of the electrode 220.

While the particular embodiment(s) described and illustrated in this patent application in the detail required to satisfy 35 U.S.C. .sctn.112 are fully capable of attaining one or more of the above-described purposes for, problems to be solved by, or any other reasons for or objects of the embodiment(s) above described, it is to be understood by those skilled in the art that the above-described embodiment(s) are merely exemplary, illustrative and representative of the subject matter which is broadly contemplated by the present application. Reference to an element in the following Claims in the singular is not intended to mean nor shall it mean in interpreting such Claim element "one and only one" unless explicitly so stated, but rather "one or more". All structural and functional equivalents to any of the elements of the above-described embodiment(s) that are known or later come to be known to those of ordinary skill in the art are expressly incorporated herein by reference and are intended to be encompassed by the present Claims. Any term used in the Specification and/or in the Claims and expressly given a meaning in the Specification and/or Claims in the present Application shall have that meaning, regardless of any dictionary or other commonly used meaning for such a term. It is not intended or necessary for a device or method discussed in the Specification as an embodiment to address or solve each and every problem discussed in this Application, for it to be encompassed by the present Claims. No element, component, or method step in the present disclosure is intended to be dedicated to the public regardless of whether the element, component, or method step is explicitly recited in the Claims. No claim element in the appended Claims is to be construed under the provisions of 35 U.S.C. .sctn.112, sixth paragraph, unless the element is expressly recited using the phrase "means for" or, in the case of a method claim, the element is recited as a "step" instead of an "act".

What is claimed is:

1. A movable electrode assembly for use in a laser system, comprising:
   a first elongated electrode;
   a second elongated electrode arranged opposite from the first electrode, the second electrode being spaced apart from the first electrode by an elongated inter electrode spacing having an initial spacing, wherein the first elongated electrode and the second elongated electrode are aligned longitudinally;
   an inter electrode spacing mechanism interfaced with at least one of the second elongated electrode or the first elongated electrode, the inter electrode spacing mechanism configured to adjust the inter electrode spacing to the initial spacing; and an electrical shield disposed between the inter electrode spacing mechanism and the second elongated electrode and the first elongated electrode.

2. The system of claim 1, wherein the inter electrode spacing mechanism includes:
 a first elongated member having a first inclined face, the first inclined face being inclined longitudinally along the first elongated member;
 a second elongated member having a second inclined face, the second inclined face being inclined longitudinally along the second elongated member, the second inclined face being substantially complimentary to the first inclined face, wherein the first inclined face is aligned longitudinally and slideably contacting the second inclined face; and
 an actuator coupled to at least one of the first elongated member and the second elongated member, the actuator configured to move the first elongated member longitudinally relative to the second elongated member.

3. The system of claim 2, wherein the inter electrode spacing mechanism further includes a tension mechanism to maintain a preselected contact pressure between the first inclined face and the second inclined face.

4. The system of claim 2, wherein the actuator is selected from the group of actuators consisting of a piezoelectric actuator, an electrostrictive actuator, a magnetostrictive actuator, a stepper motor, a servo motor, a voice coil actuator, a linear motor and a combination thereof.

5. The system of claim 2, further comprising a controller coupled to the actuator and capable of generating a control signal, and wherein the actuator is responsive to the control signal to adjust the elongated inter electrode spacing including moving the second elongated electrode relative to the first elongated electrode.

6. The system of claim 2, wherein the first inclined face includes a first plurality of inclined steps and wherein the second inclined face includes a second plurality of inclined steps being substantially complimentary to and interlocking with the first plurality of inclined steps.

7. The system of claim 2, wherein first elongated electrode, the second elongated electrode and the inter electrode spacing mechanism are included within a discharge chamber and wherein the actuator is external from the discharge chamber.

8. The system of claim 7, further comprising an electrode support bar attached to the discharge chamber, the second elongated electrode moveable relative to the support bar, the inter electrode spacing mechanism providing a heat conduction path from the second elongated electrode to the support bar.

9. The system of claim 7, wherein the actuator is coupled to the inter electrode spacing mechanism by a linkage and wherein the linkage passes through an opening in a wall of the discharge chamber.

10. The system of claim 1, further comprising a conductive member coupled to the second elongated electrode and a support bar coupled to and supporting the second elongated electrode.

11. The system of claim 10, wherein the conductive member includes one or more convolutions.

12. The system of claim 10, wherein the conductive member is flexible.

13. The system of claim 10, wherein the conductive member forms a shield protecting the inter electrode spacing mechanism from electromagnetic fields generated in the inter electrode spacing.

14. The system of claim 1, wherein the first elongated electrode has a first discharge surface and the second elongated electrode has a second discharge surface, wherein the first discharge surface and the second discharge surface are in a substantial parallel orientation.

15. The system of claim 1, wherein the inter electrode spacing mechanism includes:
 a first elongated member having a first inclined face, the first inclined face being inclined transversely across the first elongated member;
 a second elongated member having a second inclined face, the second inclined face being inclined transversely across the second elongated member, the second inclined face being substantially complimentary to the first inclined face, wherein the first inclined face is aligned longitudinally and slideably contacting the second inclined face; and
 an actuator coupled to at least one of the first elongated member and the second elongated member, the actuator configured to move the first elongated member transversely relative to the second elongated member.

16. A method of adjusting a discharge gap comprising:
 moving a first elongated member longitudinally relative to a second elongated member, the first elongated member having a first inclined face, the first inclined face being inclined longitudinally along the first elongated member, the second elongated member having a second inclined face, the second inclined face being inclined longitudinally along the second elongated member, the second inclined face being substantially complimentary to the first inclined face, wherein a second elongated electrode is coupled to the first elongated member and a first elongated electrode is opposite from the second elongated electrode, the second elongated electrode being separated from the first elongated electrode by an elongated inter electrode spacing having an initial spacing, wherein the first elongated electrode and the second elongated electrode are aligned longitudinally and shielded by an electrical shield disposed between an inter electrode spacing mechanism and the second elongated electrode and the first elongated electrode.

17. The method of claim 16, wherein the first inclined face is aligned longitudinally and slideably interfaced with the second inclined face.

18. The method of claim 16, wherein moving a first elongated member longitudinally includes activating an actuator coupled to at least one of the first elongated member or the second elongated member.

19. The method of claim 18, wherein the actuator is external from a discharge chamber, the discharge chamber including the first elongated electrode, the second elongated electrode and the elongated inter electrode spacing.

20. A movable electrode assembly for integration into a housing of a laser system, comprising:
 a first elongated electrode having a discharge surface;
 a second elongated electrode having a discharge surface, such that the discharge surface of the first elongated electrode and the discharge surface of the second elongated electrode face each other in a spaced apart setting that defines a desired elongated inter electrode spacing having an initial spacing, wherein the first elongated electrode and the second elongated electrode are aligned longitudinally;
 a mechanism for moveably adjusting the spaced apart setting toward the desired elongated inter electrode spacing; and
 an electrical shield disposed between the mechanism and the second elongated electrode and the first elongated electrode.

21. The movable electrode assembly as recited in claim 20, the mechanism being coupled to a controller, the controller configured to scan the spaced apart setting of the first and second electrodes and trigger an inter electrode spacing mechanism to move either the first or second electrodes, or both, to position the discharge surfaces of the first and second electrodes toward the desired inter electrode spacing.

22. The movable electrode assembly as recited in claim 21, wherein the inter electrode spacing mechanism includes:
   a first member having an inclined surface;
   a second member having an inclined surface, the inclined surface of the first member and the second member defined to slideably interface with each other, wherein the first and second members are coupled to one of the first or second elongated electrodes; and
   an actuator coupled to either first or second members to impart relative sliding of each of the first and second members, the relative sliding adjusting the spaced apart setting toward or near the desired inter electrode spacing.

23. The movable electrode assembly as recited in claim 20, wherein the first and second elongated electrodes extend along a length, wherein the first elongated electrode has a first discharge surface and the second elongated electrode has a second discharge surface, wherein the first discharge surface and the second discharge surface are in a substantial parallel orientation.

\* \* \* \* \*